US007096569B1

(12) United States Patent
Barr et al.

(10) Patent No.: US 7,096,569 B1
(45) Date of Patent: Aug. 29, 2006

(54) TORQUE GUARANTEE SYSTEM

(75) Inventors: Gary Barr, Delaware, OH (US); Jarom Thomas, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 158 days.

(21) Appl. No.: 10/770,714

(22) Filed: Feb. 3, 2004

(51) Int. Cl.
*B23Q 15/00* (2006.01)

(52) U.S. Cl. .......................................... 29/709; 29/700

(58) Field of Classification Search .................. 29/700, 29/701, 705, 707, 709, 407.02, 407.01, 407.03, 29/470.04, 428, 446, 525.01, 525.11; 123/90.45
See application file for complete search history.

(56) References Cited

U.S. PATENT DOCUMENTS

| | | | | |
|---|---|---|---|---|
| 2,409,397 | A | 10/1946 | Sheehan et al. | 121/35 |
| 2,569,244 | A | 9/1951 | Larson | 81/54 |
| 3,194,324 | A | 7/1965 | Langas | 173/2 |
| 3,252,641 | A | 5/1966 | Ciechanowski | 227/8 |
| 4,078,618 | A | 3/1978 | DePagter et al. | 173/12 |
| 4,813,492 | A | 3/1989 | Biek | 173/2 |
| 4,907,730 | A | 3/1990 | Dion | 227/8 |
| 5,645,208 | A | 7/1997 | Haytayan | 227/8 |
| 6,289,770 | B1 | 9/2001 | Collins | 81/57.39 |
| 6,973,905 | B1 * | 12/2005 | Hathaway et al. | 123/90.45 |

* cited by examiner

*Primary Examiner*—John C. Hong
(74) *Attorney, Agent, or Firm*—Standley Law Group LLP

(57) ABSTRACT

A system and method for guaranteeing that a torque application operation proceeds in a predetermined order. The system and method of the present invention can be used in processes that require the completion of one or more preparatory or post-torque application process steps. The steps of the overall process can be interlocked, so that the order of the process is controlled. Power to certain tool(s) used in the process may be withheld until certain process steps are accomplished, and said tool(s) may be automatically de-energized after the torquing operation is completed. Similarly, power to downstream tools may be withheld if the torquing operation is determined to be unsatisfactory or incomplete. A torque monitor/controller is provided to ensure that all elements requiring torquing are properly serviced, and that the amount of torque applied to each element is satisfactory.

43 Claims, 3 Drawing Sheets

TORQUE GUARANTEE SYSTEM

BACKGROUND AND SUMMARY OF THE INVENTION

The present invention is directed to a torque guarantee system and, more particularly, to a torque guarantee system for use in a process requiring repeated torque application. For example, the torque guarantee system of the present invention may be employed in an assembly line process to guarantee that one or more fasteners of a particular component, or assembly of components, is consistently tightened with a preselected amount of torque.

In many industrial and assembly-type operations, it is often critical that particular fasteners be installed with a predetermined amount of torque. The amount of torque used may be based on a number of factors including, for example, the material(s) through which the fastener(s) passes, the role of the fastener, the environment to which the fastened component(s) will be subjected, and the construction of the fastener itself. For example, if a fastener is overtightened, it may cause unnecessary and undesirable fatigue in the fastener, and/or may damage the component(s) through which it passes. Conversely, if the fastener is to secure a component(s) that will be subjected to a load, to vibration, or to other similar conditions, loosening of the fastener and the component(s) may occur if the fastener is not adequately tightened. Such conditions, as well as other conditions of concern, are commonly encountered, for example, in the field of automotive and/or motorcycle manufacturing. As can be appreciated, there are numerous components, particularly those relating to the engine, suspension, steering and other motive systems of such a vehicle, that could cause serious problems or damage if allowed to loosen during vehicle operation. Obviously, there are also a multitude of other situations and areas of art wherein the proper torquing of fasteners is a concern, and it is not intended that the present invention be limited to any particular field of use.

A proper amount of torque is typically applied to a fastener using a torque wrench or similar device. Such devices are generally operated by hand, but such devices may also be driven by an electric, pneumatic, or hydraulic motor. There is typically a means for manually presetting a torque limit on the device prior to use. Once the preset torque limit is reached during use, the device may, for example, emit an audible or visual signal, or otherwise cease to apply further rotational force to the fastener.

In situations wherein it is critical that a fastener(s) be tightened with a predetermined amount of torque, it is often desirable, at least as an added measure of safety, to somehow confirm that each fastener of interest has indeed been so tightened. To satisfy this desire, numerous methods of torque assurance have been tried. These methods may be as simple, for example, as marking each fastener to indicate that it has been installed with the correct amount of torque. These markings often take the form of a paint blotch or dot, wherein different paint colors may be utilized to indicate different torque levels. However, the success of this method depends entirely on the operator that installs the fastener, or an operator who subsequently checks the fastener for proper torque. As is apparent, it is certainly possible for a fastener that has had an improper torque applied thereto to be marked as correct when employing this method of torque confirmation. For example, an operator may accidentally mark a fastener that was not tightened appropriately, or that was not subsequently checked. Alternatively, it is also possible for an operator to simply mark the fastener(s) without ever knowing what amount of torque was applied to the fastener. While it is not suggested that the latter situation occurs with any particular regularity, it does highlight the dependence of this method on the skill, care, and integrity exercised by the person(s) in charge of installing and/or checking the fastener(s).

Devices have also been developed with features that attempt to control or limit torque. For example, fastener tightening tools exist that provide for automatic operation of the tool under certain conditions, such as the depression of a fastener engaging portion thereof. Other known fastener tightening tools have been designed to terminate the tightening operation upon detection of a preselected torque value, such as by disengaging a motor from a driver portion of the device or by automatically shutting off power to a drive motor. Such tools commonly use sensors, clutches or various other detection means to determine when the predetermined torque value has been reached. Yet other torque applying tools are adapted to monitor the pressure of a supply of air connected thereto and to shut off the air flow if the pressure falls below a preset level. In this manner, consistent operation of the tool is said to be achieved. Still other torque applying tools are provided with safety switches that must be engaged along with a primary device initiator, such as a trigger, before the tool will operate. These safety switches are provided to prevent premature activation of the tool to which they are installed.

None of the aforementioned tools, however, is able to guarantee that a particular fastener, or number of fasteners, has actually been installed with a specific amount of torque. While there are known devices whose use allows an operator to select a particular torque to be applied to a fastener thereby, it is ultimately up to the operator to use these devices properly, and to apply the selected device to each fastener that needs to be so installed. Thus, even if a fastener is subsequently indicated by an operator as being properly torqued, there is no non-human guarantee that such is the case. Consequently, especially with respect to fasteners securing critical components, or to fasteners that are subject to loosening due to vibration, loading, thermal cycling or numerous other conditions, a secondary torque inspection process is commonly employed. In such a process, an operator is generally tasked with checking that one or more particular fasteners has actually been tightened with a predetermined amount of torque. Again, however, the possibility for human error is obvious.

Thus, what is needed, and has to Applicant's knowledge been heretofore unavailable, is a system and method for automatically guaranteeing that a fastener, or a plurality of fasteners, are tightened with an acceptable amount of torque. The system and method of the present invention satisfies this need. The system and method of the present invention guarantees that a fastener(s), or even a non-fastener element, is subjected to a predetermined amount of torque (which may also be hereinafter referred to as "torquing" a fastener(s), or that a fastener(s) has been "torqued"). The torque applied to one or a plurality of fasteners (or non-fastener elements) may be controlled and monitored, and different amounts of torque can be applied to different fasteners. The same applies when the system and method of the present invention is used to apply torque to a non-fastener element. For purposes of clarity, however, the remaining discussion of the present invention will be limited to the use thereof with respect to a fastener installation process.

A process employing the system and method of the present invention will commonly require that an operator proceed through a number of particular process steps before a torque applying tool can be used to tighten the fastener(s) of intetrest. A system controller in communication with various sensors and other process monitoring devices is preferably employed to ensure that the fasteners are properly tightened, and that torque is applied appropriately thereto. Preferably, the system and method of the present invention indicates to a user thereof whether the torque application process was completed successfully, such as through the use of a visual and/or audible signal.

In one exemplary embodiment of the present invention, a system is provided to receive a component, or an assembly of components, having one or more fasteners passing therethrough. When a plurality of fasteners are present, it is possible that one or several of the fasteners requires installation with an amount of torque that is less than that used to install the remaining fasteners. It should be realized that any number of fasteners associated with any combination of torque values may be served by the system and method of the present invention. The component(s) is preferably loaded onto/into a work area, which may optionally employ a fixture or other such structure to receive and properly orient the component(s). However, it should be realized that such a fixture is not critical, or even necessary, to use of the present invention. Once the component(s) is properly loaded onto/into the work area, a preparatory (i.e., pre-fastener installation) process step is performed. In this particular embodiment, Loctite® or another suitable thread locking material is applied to the fastener(s) to be installed to the component(s). Other process steps may also be accomplished prior to installation of the fastener(s). Once the preparatory process(es) is completed, the component(s) is preferably clamped or otherwise held firmly in position in anticipation of fastener installation and torquing. Obviously, clamping of the component(s) could also occur prior to initiation of one or more preparatory process steps.

Only when each of the aforementioned steps has been completed is power supplied to a fastener installation tool provided to tighten the fastener(s). The installation tool may be the device used to provide the proper amount of torque to the fastener(s), or may be a separate tool. The fastener installation tool and/or the torque applying tool may be a hand tool, or may be an air or electric powered wrench, for example. In the former case, an air supply associated with the wrench may be isolated therefrom until the aforementioned steps are completed (i.e., until certain predetermined and monitored conditions are met). In the latter case, electric power may be supplied to the wrench only after said steps are completed.

Generally, there are one or more sensors associated with the system of the present invention. Signals from the sensors are received and analyzed by the system controller. The system controller is provided with data regarding a particular job(s) or process, and subsequently acts to ensure that said process is completed successfully. The system controller is also associated with a torque monitor/controller. It is contemplated that the torque monitor/controller may be integrated into the system controller (i.e., torque monitoring/control may be performed by the system controller), or may be a standalone device that is in communication with the system controller. The data provided to the system controller and/or torque monitor/controller may include an identifier for a particular component or plurality of components that are assembled using a fastener(s) of interest. Different identifiers may have different data associated therewith. The data may include the particular process steps that must be performed prior to fastener installation, the number of fasteners that must be installed with a predetermined amount of torque, and the amount of torque to be applied to each fastener (whether the same or different for the various fasteners). The data may, for example, be made available to the system controller and/or torque monitor/controller as a result of an operator inputting a specific program number or name thereto, or may be an automatic result of loading a particular component, or component assembly, into a work area.

As another example of using the system and method of the present invention, a particular job or process involves the monitored and controlled installation of four fasteners to a component assembly, with two fasteners to be installed with a first torque setting, and two fasteners to be installed with a second torque setting that is less than the first torque setting. In this particular example, the component assembly travels along a moving assembly line. Prior to fastener installation, the component assembly must enter a particular work area, and an operator must initiate the process—such as by engaging a cycle start pushbutton(s) or similar device. Thus, the system controller is provided with data that instructs it to await a cycle start signal. Once the cycle start signal is received, the system controller is programmed to supply power to the particular fastener installation tool provided, which in this particular example may be an electrically-powered combination installation/torque applying tool. The torque monitor/controller subsequently expects the four fasteners to be initially tightened, and subsequently subjected to two different, predetermined, torque settings. The torque monitor/controller is also adapted to monitor the amount of torque applied by the combination tool, and to send setting signals to the torque applying tool, which is adapted to receive said signals and to automatically change its torque setting accordingly. This particular example of using the system and method of the present invention also requires the completion of a post-torquing process, such as a crimping process. The system and method of the present invention prevents the post-torquing process from being initiated unless the torquing process was completed successfully, and may also prevent initiation of a subsequent torquing process unless the post-torquing process is completed successfully.

Therefore, as can be understood from the foregoing description, interlocks are provided that direct the process of interest to be performed in a particular manner. Data provided to and from the system controller and/or torque monitor/controller ensures that a torque applying tool automatically tightens a particular fastener with a specific and predetermined amount of torque. For example, in the latter of the particular processes described above, the fasteners that are to be installed with a lesser amount of torque are also of a different size. Thus, when a provided socket or other fastener engaging means is installed to the torque applying tool, the torque applying tool is automatically set by the torque monitor/controller to install the fastener with the proper amount (lesser amount, in this case) of torque. Consequently, the system controller is able to determine whether all the necessary process steps were completed and that they were completed in the correct order and, through the torque monitor/controller, is able to detect the number of fasteners that have been installed and the amount of torque with which each fastener was installed—thereby enabling the system and method of the present invention to accurately determine whether the overall fastener(s) installation process was successful.

Preferably, the system and method of the present invention provides for indication of successful torque application (and, thereby, a successful fastener installation process), such as by a visual and/or audible signal. Preferably, the system and method of the present invention also provides for indication of unsuccessful torque application, and may also provide specific information as to the source of any problems. For example, it may be indicated that one or more fasteners were not tightened, were not tightened with an adequate amount of torque, or were tightened with an excessive amount of torque. In such case, the present invention may provide the operator with sufficient information to permit correction of the problem. The inability to perform a post-torquing process may also serve as an indication that the torquing process was not completed satisfactorily.

It is contemplated that the system and method of the present invention may be used in conjunction with other equipment and processes, such as downstream assembly equipment in a multi-station assembly process. For example, as described above, it can be understood that a signal from the system of the present invention can be used as an interlock in a downstream process. The system controller and/or torque monitor/controller may also be associated with a database that keeps track of the fastener installation operation for quality control and/or quality assurance purposes. Additionally, while the system and method of the present invention has been described above with specific reference to its use in a fastener installation process, it should be realized that the system and method of the present invention can be employed in virtually any process wherein it is necessary to guarantee that a particular torque has been applied to an element.

A better understanding of the system and method of the present invention can be gained by a reading of the following detailed description of certain exemplary embodiments thereof, in conjunction with reference to the particular drawing figures applicable thereto.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF THE EXEMPLARY EMBODIMENT(S)

Figure 1:
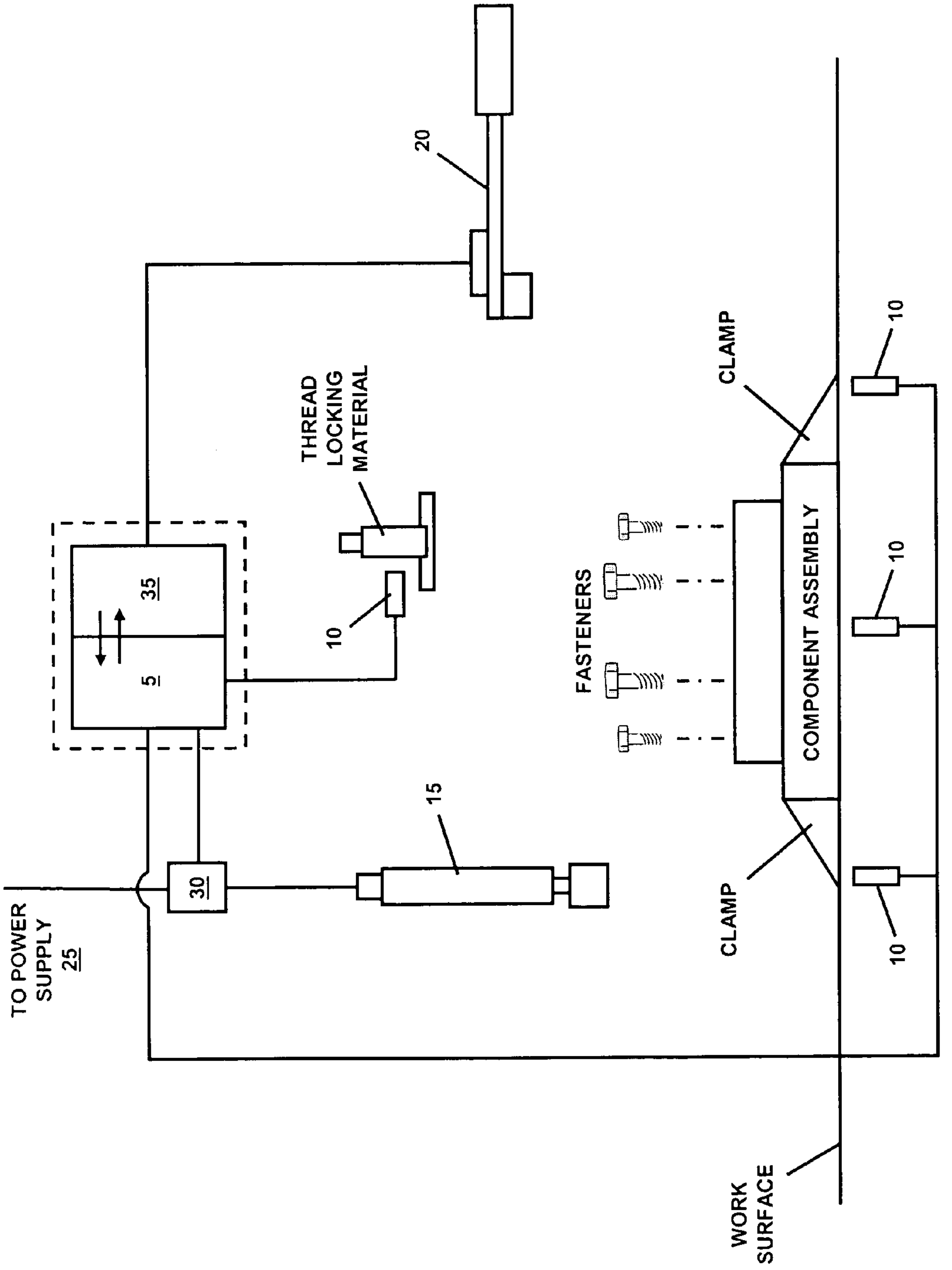
FIG. 1 is a schematic diagram of one embodiment of a system of the present invention used to guarantee that a plurality of fasteners of a particular process are installed with a specific amount of torque.
Figure 2:
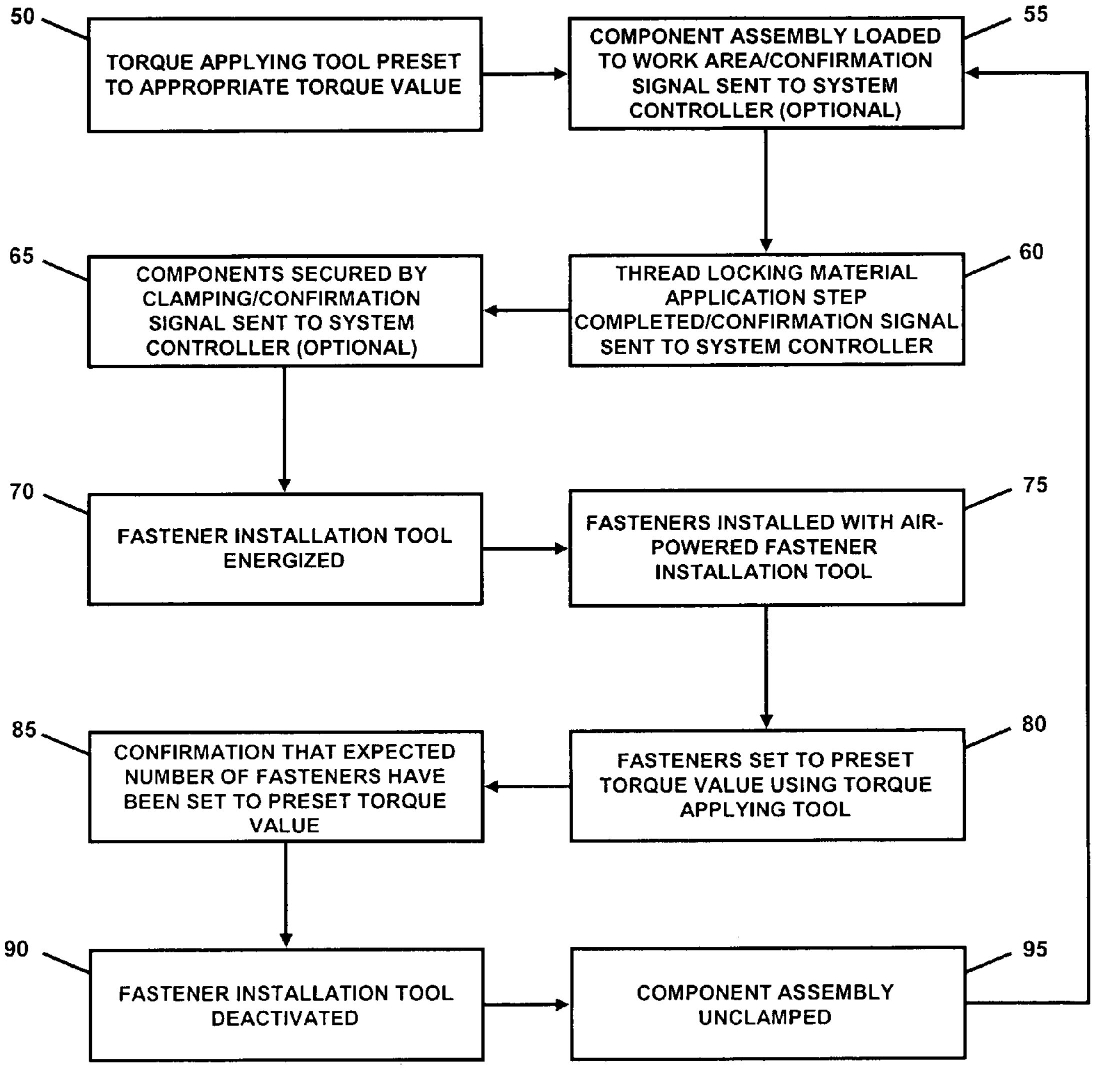
FIG. 2 is a block diagram illustrating the steps of using an exemplary embodiment of the system and method of the present invention to guarantee that a plurality of fasteners of an air-powered fastener installation process are installed with a specific amount of torque.
Figure 3:
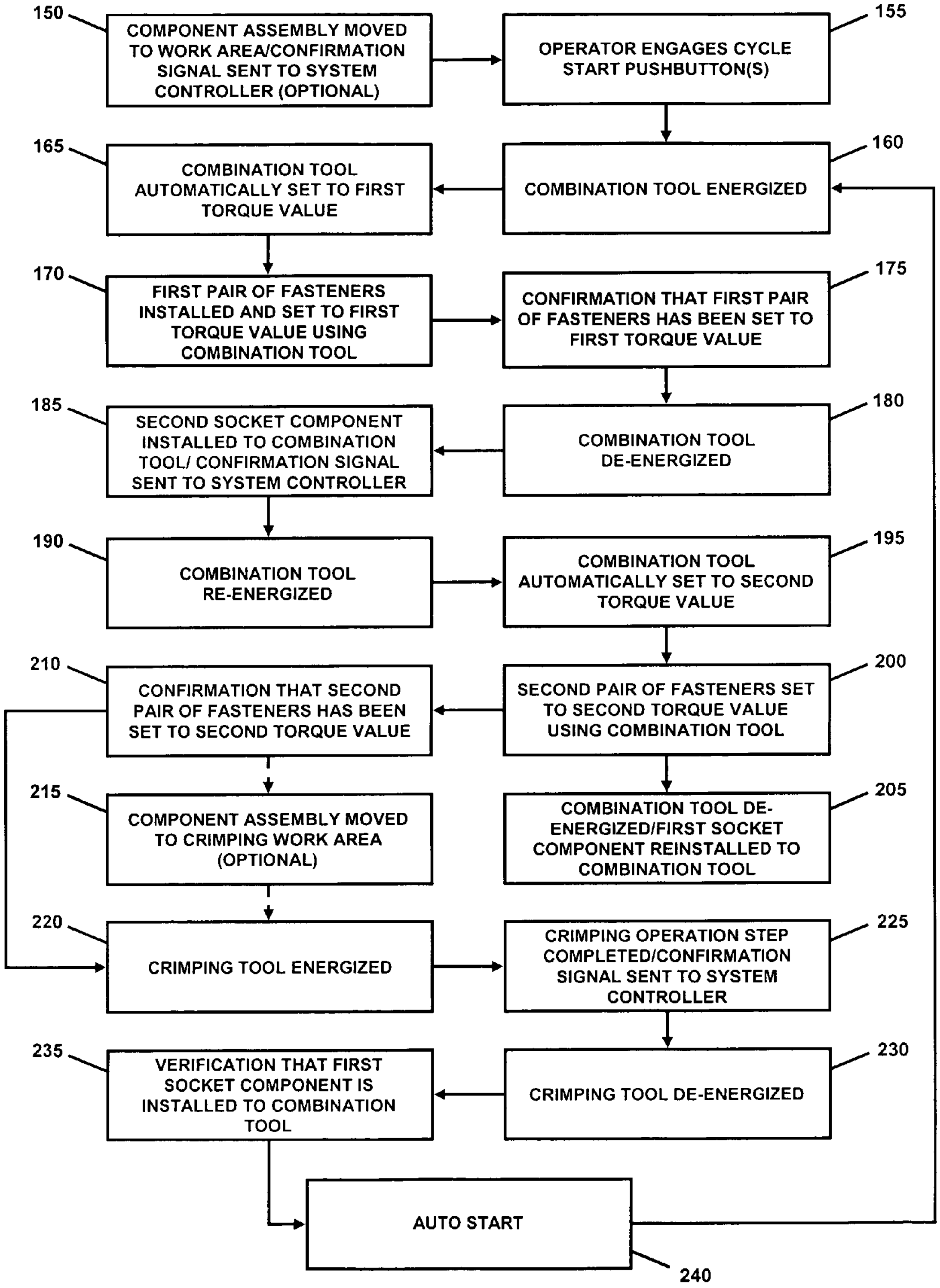
FIG. 3 is a block diagram illustrating the steps of using an exemplary embodiment of the system and method of the present invention to guarantee that a plurality of fasteners of an electric-powered fastener installation process are installed with a specific amount of torque, and that a post-torque application crimping process is completed satisfactorily.

Exemplary embodiments of the system and method of the present invention can be observed in FIGS. 1–3. Each of the embodiments can be seen to utilize a system controller 5. The system controller 5 preferably includes a programmable microprocessor. The microprocessor may be provided in the form of a programmable logic controller (PLC), or a personal computer, for example. The system controller 5 is in communication with various sensors 10 that are used to create the interlocks preferred for proper process control. Sensors 10 may be provided to monitor a variety of process conditions/steps. In the process depicted by the block diagram of FIG. 2, for example, sensors are provided to indicate that the component assembly has been properly loaded into the work area, that a thread locking material application step has been completed, and that the component assembly has been adequately secured (clamped). In the block diagram of FIG. 3 a sensor is provided to determine when installation sockets are changed on the provided torque applying tool. As can be understood, however, any number and combination of sensors can be used to accomplish the monitoring/reporting necessary to the particular process. The sensors may be limit switches, proximity switches, micro switches, laser detectors, optical or photodetectors, or any number of other types of sensors that would be known to one skilled in the art. The system controller may also be associated with a fastener installation tool 15, as well as a torque applying tool 20 (preferably through a torque monitor/controller). In an alternate embodiment, the system controller 5 may be associated with a combined fastener installation tool/torque applying tool (not shown). Such a device can be a wrench or other similar tool that is adapted to both install the fastener(s) to a general tightness, and subsequently tighten the fastener(s) with a specific and controlled amount of torque.

The system controller is also preferably associated with a power supply 25, or power supplies, that are used to drive the fastener installation and/or torque applying tools 15, 20. The power supply, or power supplies may consist of, for example, a pressurized air supply, a source of pressurized hydraulic fluid, or a source of electrical energy. More specifically, the system controller 5 is preferably in communication with one or more secondary switching devices 30, such as an electronic solenoid valve, a relay, or some other suitable device, that is able to connect/disconnect the power supply(s) upon receiving a signal from the system controller. In this manner, the fastener installation and/or torque applying tools 15, 20 may be maintained in an unusable state until one or more predetermined process steps are first performed. Upon successful completion of the process step(s), the system controller 5 signals the secondary switching device(s) 30 to provide power to the fastener installation tool 15 and/or torque applying tool 20. For example, upon receiving a signal from the system controller 5, a secondary switching device(s) 30 may shift the position of a valve spool, thereby allowing air or hydraulic fluid to flow to the tool(s), or may close a relay, allowing electrical power to be delivered to the tool(s). Power from downstream tools may be withheld in a similar manner, pending successful completion of the torquing operation.

The system controller 5 also includes, or is in communication with, a torque monitor/controller 35. It is contemplated that the system controller 5 and torque monitor/controller 35 may be integrated into a single device. Alternatively, the torque monitor/controller 35 may be a standalone device that is in electronic communication with the system controller 5 and with one or more sensors 10 or other monitoring devices used in the torque guarantee system. The torque monitor/controller 35 is provided with certain data related to the particular process being performed. Specifically, the torque monitor/controller 35 is provided with information relating to the total number of fasteners to be torqued, and the required amount of torque that must be exerted on each fastener. In this manner, the torque monitor/controller 35 portion of the present invention is able to ensure that the required number of fasteners have been installed, and that each fastener has been installed with a correct amount of torque.

The torque monitor/controller 15 is connected to the torque applying tool 20, such that the amount of torque exerted by the torque applying tool can only be monitored and recorded by the torque monitor/controller. In such an embodiment, the torque applying tool is typically set to a single predetermined torque value prior to beginning the torque application process. In another embodiment of the present invention (see process steps of FIG. 3), the proper torque setting may be determined from data associated with the particular process being performed, in combination with input signals received from various sensors. For example, in the latter of the exemplary processes described previously, the torque monitor/controller 35 is provided with data indicating that there are four fasteners to be installed, and that two of the fasteners are to be installed with a specific amount of torque that is greater than the specific amount of torque to be used during installation of the remaining two fasteners. The torque monitor/controller 35 is also provided with data indicating that the fasteners have two different head sizes, with the smaller head size being associated with the two fasteners requiring less torque. As there are two different head sizes, it is required to use two different socket components during the installation and torque applying processes. Hence, in this embodiment of the present invention, the torque monitor/controller 35 is able to set a combination fastener installatyion/torque applying tool to the appropriate torque setting based on the particular socket component that is installed thereto. The particular socket component installed to the torque applying tool may be determined by using a sensor attached thereto. Alternatively, a holder or similar structure may be provided for one or more socket components, with a sensor used to determine what socket components are present and what socket component has been removed. An interlock may be provided to ensure that the torque applying tool will only operate if one socket component is unaccounted for. In this manner, it can be ensured that the torque applying tool is always set to apply the correct amount of torque.

The torque monitor/controller 35 monitors the number of fasteners to which torque has been applied using the torque applying tool or the combination tool, and the amount of torque that was applied to each fastener. Torquing of the fasteners can occur in any order. For example, in the latter embodiment described above, the two fasteners requiring a greater amount of torque may be acted on first, the two fasteners requiring a lesser amount of torque may be acted on first, or the torquing operation may alternate back-and-forth between the two sets of fasteners. Because the torque monitor/controller 35 of this embodiment is provided with the necessary process data and is able to automatically set the combination tool to provide the proper amount of torque, it can be assured that each of the fasteners that so require will be appropriately torqued—regardless of the order in which the torquing operation proceeds. As the torque applying tool operates on each fastener, the torque monitor/controller 35 monitors and, optionally, records the actual amount of torque applied thereto. If the applied torque falls within predetermined limits surrounding the specified torque, the torque monitor/controller 35 reduces by one the number of remaining torque operations yet to be performed. Only when the remaining torque operations count reaches zero, and all appropriate fasteners have been tightened to an acceptable torque level, will the torque monitor/controller 35 indicate that the torquing operation was successful.

The fastener installation tool 15 referred to above may be a pneumatic, hydraulic, or electric tool, such as, for example, a ratchet wrench or impact wrench. Alternatively, a hand tool, such as, for example, a wrench or other appropriate drive tool may be provided for performing the fastener installation process—as long as an operator is prevented (such as by interlocks) from bypassing any requisite preparatory steps of the process. Once the provided fastener installation tool 15 is supplied with power, or the requisite preparatory steps of the process have been satisfactorily completed, the fastener(s) can be installed with the fastener installation tool.

In either of the above cases, wherein an independent fastener installation tool 15 is provided, a separate torque applying tool 20 is also provided to ensure that a proper amount of torque is applied to each appropriate fastener after the initial installation thereof. The torque applying tool 20 may be a typical, manually operated and adjustable torque wrench—with the difference being that it has been adapted to automatically send a signal to the torque monitor/controller 35 upon achieving its preset torque limit during the torquing of a fastener. Such a torque wrench is available from Snap-On® Incorporated in Kenosha, Wis. Alternatively, the torque applying tool 20 may be a customized device designed to operate on the particular fastener(s) or element(s) to be torqued. In another embodiment of the present invention, the fastener installation tool and the torque applying tool can be embodied in a single combination device (not shown). For example, such a device may be an electric-powered installation tool with integrated torque measuring features, which can also be automatically set to different torque values by the torque monitor/controller 35.

Use of an exemplary embodiment of the system and method of the present invention to guarantee that a plurality of fasteners of an air-powered fastener installation process are installed with the proper amount of torque is depicted in FIG. 2. This particular process is performed on a stationary work area, as opposed to on a moving assembly line. Preferably, a series of steps must be performed before the fasteners can be tightened and a controlled amount of torque applied thereto. Each of the steps may be associated with an interlock or some other means of assuring that a prior step has been completed before allowing the initiation of a subsequent step.

In this embodiment, a torque applying tool is first preset to a predetermined torque value 50 appropriate to the particular process at hand. To begin the process, a component assembly is loaded to a work area 55. Once properly loaded, this particular process requires that a thread locking material, such as Loctite®, be applied to the threads of the fasteners that will be installed 60. Tools, supplies, and other equipment used in any pre-fastener installation process can be monitored, and signals from sensors associated therewith can be used to create interlocks that ensure that necessary process steps are carried out before fastener installation can be initiated. For example, when a thread locking material must be applied prior to fastener installation, its container may be associated with an interlock that is satisfied only once the container is removed and subsequently replaced to its holder. The interlock may be comprised of a sensor, such as a limit switch, proximity switch, laser, or some other suitable means of detecting the removal and replacement of the container, coupled to the system controller 5 and or torque monitor/controller 35. Certainly, other means may also be used to determine whether a particular requisite process step has been completed, and a variety of such means would be well known to one skilled in the art. A multitude of process steps may also be required prior to fastener installation, any of which can be monitored and used as an interlock as described above. Once the thread locking material application step has been completed, the assembly is secured against movement by clamping 65. While it may be possible to clamp the assembly manually, it is contemplated that an automatic clamping system can be used to save process time.

Once the requisite preparatory steps have been successfully completed, the fastener installation process may begin. As stated above, this particular embodiment of the present invention uses air power to initially tighten the fasteners. Prior to completion of the requisite preparatory steps, the air supply connected to the pneumatic fastener installation tool is blocked or otherwise disconnected. Once the requisite preparatory steps have been successfully completed, the air supply is unblocked or otherwise reconnected in response to a signal form the system controller 5, thereby energizing the pneumatic fastener installation tool 70. Preferably, the air supply is maintained at, or regulated to, a pressure that ensures the fasteners will not be installed by the pneumatic fastener installation tool with an amount of torque that exceeds the predetermined torque value(s).

Simultaneously with, or subsequent to activation of the pneumatic fastener installation tool, the torque applying tool may also be activated. Alternatively, the torque applying tool may always be active. In this particular embodiment of the system and method of the present invention, it is contemplated that a specially adapted manual torque wrench can be used to apply the necessary torque to the fasteners. The torque wrench is adapted to send a signal each time it applies a torque equivalent to its preset torque value. The torque wrench is connected to the torque monitor/controller 35, which is aware of the preset torque value to which the torque wrench has been previously set. Thus, in this particular embodiment, activation of the torque applying tool would consist merely of activating the link between the torque wrench and the torque monitor/controller 35. This may be done for each operation cycle, or the link may remain active once the torque monitor/controller is initially turned on.

With the fastener installation tool energized, and the torque applying tool activated, the fasteners are installed using the fastener installation tool 75. After the fasteners have been preliminary installed using the pneumatic fastener installation tool, the fasteners are torqued to the appropriate level using the torque applying tool 80. Preferably, the predetermined torque value to be monitored by the torque monitor/controller 35 has an upper and lower limit associated therewith, such that torquing the appropriate fastener(s) to a torque value that falls within the range of the upper and lower limits will satisfy the torque monitor/controller. Upon satisfactorily torquing a fastener, the operator moves on to the next fastener until all have been torqued. The torque monitor/controller 35 keeps track of the number of fasteners that have been torqued using the torque applying tool by counting the number of signals received therefrom. Therefore, it can be confirmed that all of the fasteners have been appropriately torqued using the torque applying tool provided 85.

Once all of the fasteners of the present example have been acceptably torqued, the torquing process is deemed complete. Preferably, there is an indication that the fasteners were satisfactorily torqued. Because the torquing operation as well as any earlier preparatory process steps are monitored, and interlocks are employed, it can be guaranteed that the process was performed as required. Therefore, upon confirmation that all of the fasteners have been appropriately torqued, the fastener installation tool is again deactivated 90, and the component assembly is unclamped 95 to allow for further processing, installation, packaging, shipping, etc., with the guarantee that any fasteners that so require have been installed with the correct amount of torque. The torque applying tool may also be optionally deactivated after the component assembly is unclamped, as opposed to prior to the unclamping thereof.

In alternate embodiments of the above exemplary embodiment, more than one size fastener, requiring more than one preset torque, may be installed. For example, in an alternate embodiment of the above example, there may be a total of four fasteners to be torqued. However, in this example, two of the fasteners have a head size that is larger than the remaining two fasteners. It is also known that the two fasteners having the larger head size are to be installed with a predetermined amount of torque that is greater than that to be used to install the two fasteners having a smaller head size. Consequently, two predetermined torque values must be set and monitored. This can be accomplished by employing two different torque applying tools, with each torque applying tool equipped with an appropriately sized socket and set to a predetermined torque value that corresponds to the fastener pair which it will install. Each torque applying tool may be connected to a single torque monitor/controller, or each torque applying tool may be associated with its own torque monitor/controller. In the former case, the torque monitor/controller must be switched to the appropriate torque value when the torquing operation moves from one fastener pair to the other. In the latter case, each torque monitor/controller monitors only one torque applying tool, so no switching is necessary.

An example of using yet another embodiment of the system and method of the present invention can be observed by reference to the block diagram of FIG. 3. This example illustrates use of the system and method of the present invention with a component assembly residing on a moving assembly line, wherein the component assembly is not clamped or otherwise secured to the work area. In this example, a combination fastener installation/torque applying tool is employed to install and torque the fasteners, and an interlocked crimping process is included after the torquing operation. The combination fastener installation/torque applying tool is electrically powered. There are four fasteners to be installed, with one pair of fasteners having a head size that is different than the head size of the second pair of fasteners, and requiring installation with a different amount of torque. A series of steps may again be performed before the fasteners are installed and a controlled amount of torque applied thereto, although such is not expressly illustrated in this particular example. Each of such steps can again be associated with an interlock or some other means of assuring that a prior step has been completed before allowing the initiation of a subsequent step.

The process of this example begins when the moving component assembly enters the work area 150. Once properly within the work area, an operator engages a cycle start pushbutton(s) or some similar means of initiating the installation/torquing process 155. In this particular example, the combination tool is energized 160 only after the cycle start pushbutton(s) are engaged. If preparatory process steps are included, the combination tool may not be energized until it is confirmed that said steps have been successfully completed. Subsequent to energization, the combination tool is automatically set to a predetermined first torque value 165 by the torque monitor/controller 35. The predetermined first torque value is associated with a first fastener pair and, therefore, a first (particular) socket component. The combination tool may be prevented from operating if the preset torque value and the socket component do not match.

As stated above, this particular embodiment of the present invention uses an electrically-powered combination fastener installation/torque applying tool to tighten and apply the proper amount of torque to the fasteners in one step. Hence, once the combination fastener installation/torque applying tool is set to apply the correct amount of torque, the appropriate fastener pair is installed and properly torqued therewith 170. During the torquing operation, the torque monitor/controller 35 again monitors the amount of torque that is actually applied to each fastener, and ensures that the amount of torque applied falls within a predetermined limit range. Upon satisfactorily torquing each fastener of the first fastener pair, the torque monitor/controller 35 preferably indicates that the torquing operation with respect thereto was successful (i.e., that the fasteners were set to an acceptable torque value) 175. Once it is determined that the first pair of fasteners was successfully torqued, the combination tool is de-energized 180, and the operator installs a second socket component that corresponds to the fasteners of the second fastener pair 185. In one embodiment of the present invention, installing the second socket component consists of removing the first socket component from the combination tool and replacing it with the second socket component. In another embodiment of the present invention, installing the second socket component consists of inserting a specialized drive portion thereof into the first socket component, while the first socket component remains attached to the combination tool (such as would be understood by one skilled in the art). A specially adapted socket holder incorporating one or mores sensors may be used to determine what socket is installed to the combination tool. Other means of sensing the particular socket component currently in use are also possible, and would be known to those skilled in the art. Once it is confirmed that the second socket component is installed to the combination tool, the combination tool is re-energized 190.

Installing the second socket component causes the torque monitor/controller 35 to automatically set the combination fastener installation/torque applying tool to a predetermined second torque value that corresponds to the second fastener pair 195. The second pair of fasteners is then installed and torqued to their predetermined torque value using the combination fastener installation/torque applying tool 200. Upon satisfactorily torquing of each of the fasteners of the second fastener pair, the torque monitor/controller 35 preferably indicates that the torquing operation with respect thereto was successful (i.e., that the fasteners were set to an acceptable torque value) 210. Additionally, once the torquing process is complete, the combination tool is once again de-energized—allowing for the first socket component to be reinstalled thereto 205. In the alternate embodiment described above, the second socket component is merely removed from the first socket component (which always remains on the combination tool) and returned to its holder. Preferably, there is an indication that the fasteners were satisfactorily torqued. Reinstallation of the first socket component causes the torque monitor/controller 35 to automatically reset the combination tool to the first predetermined torque value upon receipt of the next cycle start signal.

In this example, a crimping operation must be performed after the fasteners have been properly torqued. The crimping operation is typically considered a downstream operation, and will generally be performed by a different operator. Thus, the component assembly may optionally be moved to a separate crimping operation work area 215 prior to initiating the crimping operation. In this particular example, the crimping operation is accomplished using a pneumatic crimping tool that is connected to an air supply. In a manner similar to that described with respect to the process of FIG. 2, the air supply connected to the pneumatic crimping tool is blocked or otherwise disconnected until a signal is received by the system controller confirming that the torquing process (and any process steps in preparation thereof) has been satisfactorily completed. Once the requisite preparatory steps and the torquing process have been satisfactorily completed, the air supply is unblocked or otherwise reconnected, and the crimping tool is energized 220. The crimping tool may be energized before or after the component assembly is moved to a separate crimping operation work area, when such movement occurs.

With the crimping tool energized, the crimping operation step is completed 225. In this particular example, the crimping process is monitored and interlocked, as previously described with respect to other process steps. For example, in this particular process, the system controller 5 may receive a signal from an air pressure sensor that is employed to ensure that the crimping tool is actually operated. Alternatively, a signal may be sent once the crimping tool has been removed from a holder and returned thereto, or a sensor could be provided to actually inspect the result of the crimping process. Other methods of verifying the crimping process, or other post-torquing process steps, will be known to those skilled in the art. In any event, once it is confirmed that the crimping process has been completed, a signal is preferably sent to the system controller 5. In response to receipt of this signal, the system controller 5 de-energizes the crimping tool 230.

Because the crimping process is interlocked with the torquing operation, the fasteners of the next component assembly in line cannot be tightened and torqued until it is confirmed that the crimping operation has been completed, and that the first socket component has been re-installed to the combination tool (or the second socket component has been removed from the first socket component). Once it is verified that the first socket component has been re-installed to the combination tool 235, an autostart signal is generated 240 that causes the combination tool to be energized and allows for a new torquing operation to begin.

Thus, by using the system and method of the present invention, it can be ensured that the torquing process was completed successfully before additional operations can be performed on the component assembly. By withholding power from the crimping tool if the torquing process was not successfully completed, the downstream crimping operator will be made aware of the torquing process problem, thereby automatically providing for an additional quality check. For example, if the component assembly is moved to the crimping work area but the crimping tool remains non-energized, the crimping operator may surmise that the torquing operation was not successfully completed. In such a case, the component assembly may be removed from the assembly line for an additional torque check, or may be passed back to the torquing operator for reprocessing (if line speed allows).

If the crimping process (or other post-torquing process) is monitored and interlocked, the system controller 5 must receive a signal indicating that the crimping process has been successfully completed before a downstream process can be performed. Once the system controller receives the confirmation signal indicating that the crimping process has been completed, the component assembly may be subjected to further processing, may be installed, or may be packaged or shipped. Non-completion of the crimping operation, or of another post-torquing process step(s), can also prevent the initiation of the next torquing operation. Because the torquing operation as well as any earlier preparatory process steps are monitored, and interlocks are employed, it can be guaranteed that the overall process was performed as required.

It is not intended in the above examples to suggest that installing and/or torquing the fasteners of interest must occur in any particular order. Rather, it should be realized that the fasteners can be installed in any order. For example, in the latter of the above-recited exemplary processes, the fastener pair requiring less torque could be installed and torqued first, or the fastener pair requiring more torque could be installed and torqued first. Alternatively, the torquing process could alternate back-and-forth between fasteners requiring different torque settings—although such an operation would be less efficient. In the former example, it is possible to install only a portion of the fasteners, then torque the fasteners that have been installed, then install another portion or the remainder of the fasteners, and continue the torquing process. Because the system and method incorporates both the monitoring and interlocking of process steps, the overall success of the process can be guaranteed even if the order in which certain individual steps are performed is changed. Similarly, it should also be realized that while the above-described examples only make use of two different torque settings, any number of different torque settings may be specified, and the application of different torques to different fasteners can occur in various order.

It is also contemplated that the system and method of the present invention can indicate that a particular process step was not completed successfully. With respect to more complex process steps, it may also be possible for the system and method of the present invention to provide information that allows an operator to correct the problem. Such an indication may be accomplished in a multitude of ways. In one embodiment of the present invention, indicator lights may be provided to designate when a particular condition has been fulfilled, such as, for example, when the component assembly of the aforementioned examples has been successfully clamped. Other indicator lights may be provided to remind an operator that a particular process step, or portion of a process step, has yet to be completed. For example, in the former of the aforementioned examples, an indicator light may be provided to specify whether or not the thread locking material has been applied to the fasteners—which, if it has not, would explain the lack power to the installation tool. A more elaborate indicator system may also be provided, such as a system that uses a display screen (e.g., a CRT or LCD screen). Such a display screen could be tied to the system controller 5, the torque monitor/controller 35, or both, whereby more specific information regarding a particular process step, or the process as a whole, may be presented. For example, during the torque applying portion of the process, the target torque, the upper and lower limits associated therewith, and the actual torque applied by the torque applying device may be displayed. If a torque is applied that falls outside the torque limit, the operator could be notified, as well as presented with information on whether the applied torque was too high, too low, and by how much it was out of tolerance. Of course, many other displays could be provided to assist an operator in completing the process at hand, and the above examples are not meant to limit the types or number of displays that can be used in any way.

Therefore, from the foregoing description of certain embodiments of the system and method of the present invention, and from the particular examples of using the system and method of the present invention presented herein, it can be understood that the proper application of torque to a fastener(s) or other element can be guaranteed thereby. It can also be understood that the system and method of the present invention can be used in a virtually unlimited number of different processes involving the application of torque to an element. Thus, while certain embodiments of the present invention are described in detail above, the scope of the invention is not to be considered limited by such disclosure, and modifications are possible without departing from the spirit of the invention as evidenced by the following claims:

What is claimed is:

1. A system for ensuring that a manual fastener installation and torquing process having one or more necessary pre-fastener installation process steps proceeds in a predetermined manner, said system comprising:

- a system controller for monitoring and controlling said process, said system controller provided with data relating to individual steps of said process;
- one or more sensors for monitoring the status of at least certain ones of said pre-fastener installation process steps;
- a powered fastener installation tool for initially installing one or more fasteners;
- a torque applying tool; and
- a torque monitor/controller in communication with said system controller and said torque applying tool, said torque monitor/controller adapted to determine whether an acceptable amount of torque has been applied to said one or more fasteners by said torque applying tool;
- wherein said powered fastener installation tool is energized only after at least certain ones of said pre-fastener installation process steps are indicated as being satisfactorily completed by said one or more sensors; and
- wherein said powered fastener installation tool is de-energized after an acceptable amount of torque is deemed to have been applied to said one or more fasteners.

2. The system of claim 1, wherein said system controller and said torque/monitor controller are part of the same device.

3. The system of claim 1, wherein said system controller and said torque/monitor controller are separate devices.

4. The system of claim 1, wherein sensors are provided to monitor one or more post-torque application process steps.

5. The system of claim 1, wherein said system controller uses signals from said sensors to form interlocks that require said pre-fastener installation process steps to be successfully completed prior to energizing said fastener installation tool.

6. The system of claim 5, wherein said torque applying tool is deactivated prior to release of said interlocks.

7. The system of claim 1, further comprising a sensor for determining if a process component has been properly loaded to a work area.

8. The system of claim 1, further comprising a sensor for determining if a process component has been properly secured within a work area.

9. The system of claim 1, further comprising a sensor for determining if a particular material application process step has been completed.

10. The system of claim 1, further comprising an indicator for specifying when a particular process step has been satisfactorily completed.

11. The system of claim 1, further comprising an indicator for specifying when a particular process step has not been satisfactorily completed.

12. The system of claim 11, further comprising a means of providing information to an operator that assists the operator in satisfactorily completing the process step.

13. The system of claim 1, wherein said data is provided to said system controller and/or said torque monitor/controller automatically as a result of an operator selecting a particular program number or program name that is associated with said process.

14. The system of claim 1, wherein said data is provided to said system controller and/or said torque monitor/controller automatically as a result of the detection of a particular process component.

15. The system of claim 1, wherein there are multiple torque settings associated with the fasteners of said process.

16. The system of claim 15, wherein more than one torque applying tool is provided, each torque applying tool set to a different predetermined torque value and in communication with a torque monitor/controller.

17. The system of claim 1, wherein a process complete signal from said system controller and/or said torque monitor/controller is used as an interlock in a downstream process.

18. The system of claim 1, wherein said torque monitor/controller is in communication with a database for recording the amount of torque applied to each element.

19. The system of claim 1, wherein said torque monitor/controller is in communication with a means for displaying the amount of torque applied to each element.

20. The system of claim 1, wherein said predetermined amount of torque has an upper and lower limit.

21. The system of claim 20, wherein the application of torque to an element is considered satisfactory if the amount of torque applied thereto falls within said limits.

22. A system for ensuring that an operator-performed fastener installation and torquing process having one or more necessary pre-fastener installation process steps proceeds in a predetermined manner, said system comprising:

a system controller for monitoring and controlling said process, said system controller provided with data relating to individual steps of said process;

one or more sensors for monitoring the status of at least certain ones of said pre-fastener installation process steps and reporting said status to said system controller;

a powered combination fastener installation/torque applying tool for installing and properly torquing one or more fasteners, said combination tool adapted to automatically change its torque setting in response to an appropriate signal from said torque monitor/controller;

a torque monitor/controller in communication with said system controller and said combination tool, said torque monitor/controller adapted to automatically change torque settings of said combination tool and to determine whether an acceptable amount of torque has been applied to said one or more fasteners by said combination tool;

wherein said system controller uses signals from said one or more sensors to create interlocks that ensure said pre-fastener installation process steps are accomplished satisfactorily and in the proper order;

wherein said combination tool is energized only after at least certain ones of said pre-fastener installation process steps have been satisfactorily completed;

wherein said combination tool is de-energized after an acceptable amount of torque is deemed to have been applied to said one or more fasteners; and whereby an operator is prevented from conducting said fastener installation and torquing process in an improper order.

23. The system of claim 22, wherein said system controller and said torque/monitor controller are part of the same device.

24. The system of claim 22, wherein said system controller and said torque/monitor controller are separate devices.

25. The system of claim 22, wherein an operator must engage a cycle start initiator prior to beginning said fastener installation portion of said assembly process.

26. The system of claim 22, wherein said combination tool is pneumatically powered and is de-energized by disconnecting it from a pressurized air supply.

27. The system of claim 22, wherein said fastener installation tool is electrically powered and is de-energized by disconnecting it from an electric power supply.

28. The system of claim 22, wherein sensors are provided to monitor one or more post-fastener torquing process steps.

29. The system of claim 22, wherein power is withheld from a device of a downstream process if said fastener torquing operation is deemed incomplete by said system controller.

30. The system of claim 22, further comprising a sensor for determining if a process component has been properly loaded to a work area.

31. The system of claim 22, further comprising an indicator for specifying when a particular process step has been satisfactorily completed.

32. The system of claim 22, further comprising an indicator for specifying when a particular process step has not been satisfactorily completed.

33. The system of claim 32, further comprising a means of providing information to an operator that assists the operator in satisfactorily completing the process step.

34. The system of claim 22, wherein said data is provided to said system controller and/or said torque monitor/controller automatically as a result of an operator selecting a particular program number or program name that is associated with said process.

35. The system of claim 22, wherein said data is provided to said system controller and/or said torque monitor/controller automatically as a result of the detection of a particular process component.

36. The system of claim 22, wherein there are multiple torque settings associated with the fasteners of said process.

37. The system of claim 22, wherein a signal from said system controller and/or said torque monitor/controller is used as an interlock in a downstream process.

38. The system of claim 22, wherein said torque monitor/controller is in communication with a database for recording the amount of torque applied to each fastener.

39. The system of claim 22, wherein said torque monitor/controller is in communication with a means for displaying the amount of torque applied to each fastener.

40. The system of claim 22, wherein said predetermined amount of torque has an upper and lower limit.

41. The system of claim 40, wherein the application of torque to a fastener is considered satisfactory if the amount of torque applied thereto falls within said limits.

42. The system of claim 22, wherein said component assembly is traveling along a moving assembly line.

43. A system for ensuring that an operator-performed process having one or more pre-fastener installation steps, one or more fastener installation and torquing steps, and one or more post-fastener installation steps, proceeds in a predetermined manner, said system comprising:

a system controller for monitoring and controlling said process, said system controller provided with data relating to individual steps of said process;

one or more sensors for monitoring the status of at least certain ones of said process steps and reporting said status to said system controller;

a powered combination fastener installation/torque applying tool for installing and properly torquing one or more fasteners;

a torque monitor/controller in communication with said system controller and said combination tool, said torque monitor/controller adapted to determine whether an acceptable amount of torque has been applied to said one or more fasteners by said combination tool;

wherein said system controller uses signals from said one or more sensors to create interlocks that ensure said pre-fastener installation steps and said post-fastener installation steps are accomplished satisfactorily and in the proper order;

wherein said combination tool is energized only after at least certain ones of said interlocks are released;

wherein said combination tool is de-energized after said torque monitor/controller deems that an acceptable amount of torque has been applied to said one or more fasteners;

wherein said system controller uses signals from said one or more sensors to prohibit initiation of one or more downstream post-fastener installation steps if at least certain previously monitored and performed process steps are determined to be unsatisfactory; and whereby an operator is prevented from conducting said process in an improper order and/or an incomplete manner.

* * * * *